July 30, 1940.  J. ROONEY  2,209,579

OPTICAL DEVICE

Filed July 1, 1939

Inventor
John Rooney
By
Attorney

Patented July 30, 1940

2,209,579

UNITED STATES PATENT OFFICE 2,209,579

OPTICAL DEVICE

John Rooney, Chicago, Ill.

Application July 1, 1939, Serial No. 282,555

3 Claims. (Cl. 2—12)

This invention relates to improvements in optical devices and is more particularly concerned with viewer devices to be positioned before the eyes to minimize or dim bright or glaring light.

A general object of the invention is to provide a device which is primarily adapted for use by motorists as dimmer glasses to protect the eyes from glare of approaching headlights, wet pavements, or the like, but which is equally as well adapted for use by sportsmen or others to protect the eyes from glaring sunlight or by users indoors for shading the eyes when reading or working by bright artificial light.

Another object of the invention is to provide a device of the above character which may include no glass or other breakable parts and which is of extremely durable and simple construction.

Another object is to provide a device which may be positioned relative to the eyes so as to constantly dim glaring light or which, without any change in construction or adjustment, may be positioned relative to the eyes so as not to interfere with or obstruct normal vision but in position to be called into operation when desired by a mere tilting of the user's head in the direction of the glare.

Another and more particular object of the invention is to provide a device which may be attached to the head with temple members or the like and which comprises for its viewer portion a plurality of relatively thin bars, vertically spaced a slight distance, and adapted to be positioned horizontally across the line of vision of the user.

Other and further objects and advantages of the invention will be apparent from the following detailed explanation taken in connection with the accompanying drawing wherein a preferred embodiment of the principles of the invention has been selected for exemplification.

Figure 1:
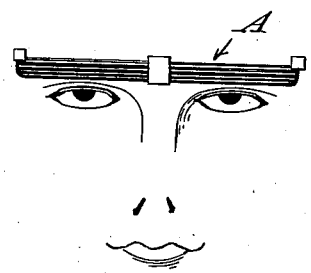
Fig. 1 illustrates a preferred manner of wearing a device constructed according to my invention.
Figure 2:
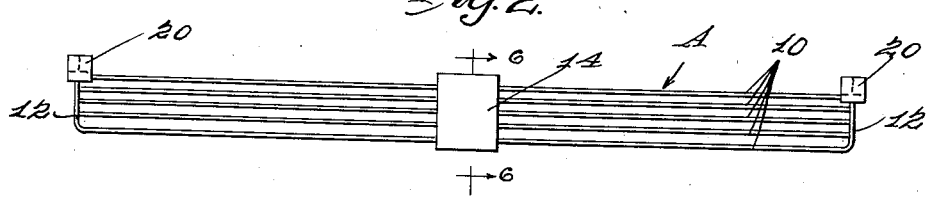
Fig. 2 is an enlarged front elevational view of the device of Fig. 1.

Referring more particularly to the drawing wherein like numerals refer to like parts, the device indicated generally by the numeral A is formed of a plurality of relatively slender or narrow rods or plates 10 parallelly positioned in slightly spaced relationship and adapted to be disposed horizontally before a user's eyes. The bars 10 may be of any suitable shape, relative size or material, and in one form of the invention may consist of rods of round bright metal.

In the preferred construction, one of the bars 10, such as the lower member, may be of greater length than its companion bars with its extremities bent to extend upwardly to form an end frame or posts 12 to which the extremities of the other bars may be attached as by soldering or in any other suitable manner.

The rods 10 are preferably of a length sufficient to extend across the forehead of the user laterally beyond the eyes as illustrated in Figure 1 but may, if desired, be of any length sufficient to extend across the pupil of an eye. In the construction illustrated, the rods 10 are held together in the desired spaced relationship at their intermediate portions by a member 14 which may be of soft yieldable material such as rubber which may also function to space the rods 10 from the user's eyes and serve as a nose piece. The member 14 is conveniently formed of sections 16 provided with grooves to receive the rods 10, and which sections are adhered or otherwise joined together to fix the rods in the desired spaced relative position.

The device indicated generally by the numeral A and composed of the plurality of rods 10 and nose-piece 14 is designed to be positioned directly in front of the eye pupils of the user in the normal line of vision or above the pupils and out of the normal line of vision as illustrated in Figure 1, whereupon the device may be brought into operation, for example by a motorist, by a mere lowering of his head a few degrees so that vision of the glare from approaching headlights will be through the rods 10 which act to diffuse or diminish the blinding rays which would normally enter the eye, without, however, obscuring the prominence or color of illuminated objects.

The device may be secured to the user by means of the usual templer members or ear engaging bows indicated at 18. The elasticity or flexibility of adjustment of the templers 18 coupled with the frictional contact of the member 14 with any portion of the nose of the user makes it possible to position the device in any operable position relative to the eyes, either directly in the normal line of vision thereof, or slightly thereabove as illustrated.

In a convenient construction, the templer or ear engaging members 18 may be mounted on upwardly protruding extensions of the posts 12 upon which the forward ends of the templers may be swiveled through an aperture 19. The protruding end of the posts 12 may be offset or otherwise arranged to retain the forward end of the templers.

Figure 3:
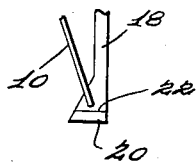
Fig. 3 is a fragmentary detailed view showing the bottom of the forward end of a templer member in partially open position.
Figure 4:
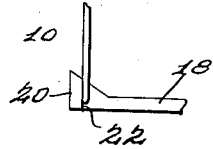
Fig. 4 is a view similar to Fig. 3 but showing the templer member fixed in open position.
Figure 5:
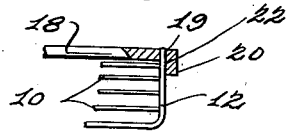
Fig. 5 is a fragmentary perspective partly in section of an end portion of the device of Fig. 2 showing the templer member in closed position.
Figure 6:
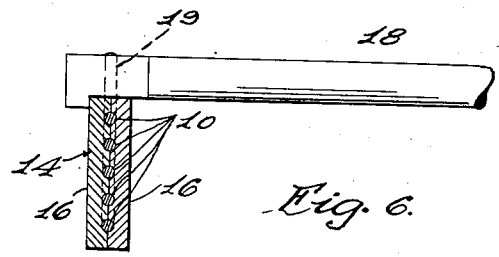
Fig. 6 is an enlarged section taken on the line 6—6 of Fig. 2.

As a further novel feature of the invention, the templers 18 may be provided each with a downwardly projecting forward extremity 20 forming a shoulder 22, best illustrated in Figures 3 to 5, which engage the uppermost rod 10 when the templers are open thereby to limit the pivotal movement of the templers to a selected arc such as of 90° while permitting the templers to be folded lengthwise of the rods 10 for carrying purposes.

It is understood that the device herein illustrated and described is exemplary only of the principles of my invention which may be embodied in such modified constructions as are within the scope of the following claims.

What I claim is:

1. A device of the character described comprising a plurality of parallel rods spaced apart to permit vision therethrough and extending at least the width of a pair of human eyes, and a yieldable member nose-piece for horizontal positioning said rods before the eyes, an intermediate portion of the length of said rods being imbedded in said yieldable member whereby the rods are held in spaced parallel position.

2. A device of the character described comprising, a plurality of elongated members spaced apart to permit vision therethrough, posts extending transversely of said members at each end thereof and secured to each of said members to hold the same in spaced relationship, each of said posts having an extension projecting beyond said members, and templers pivoted to said extensions for engaging the ears of a wearer to visually position said members.

3. An optical device for dimming light comprising, a plurality of parallel rods spaced apart to permit vision therethrough and extending at least the normal width of a pair of human eyes, a nose-piece for horizontally positioning said rods before the eyes, an intermediate portion of the length of said rods being fixed to said nose-piece whereby the intermediate portions of the rods are held in spaced parallel position, posts extending transversely of said rods at each end thereof and secured to each of said rods to hold the ends thereof in spaced relationship, each of said posts having an extension projecting beyond said rods, and templer members pivoted to said extensions for engaging the ears of a wearer to position the rods before the eyes.

JOHN ROONEY.